United States Patent [19]

Stoll

[11] 4,354,125
[45] Oct. 12, 1982

[54] MAGNETICALLY COUPLED ARRANGEMENT FOR A DRIVING AND A DRIVEN MEMBER

[76] Inventor: Kurt Stoll, Lenzhalde 72, D-7300 Esslingen, Fed. Rep. of Germany

[21] Appl. No.: 153,999

[22] Filed: May 28, 1980

[30] Foreign Application Priority Data

Jun. 1, 1979 [DE] Fed. Rep. of Germany ....... 2922444

[51] Int. Cl.³ .......................................... H02K 49/00
[52] U.S. Cl. ..................................... 310/103; 310/104
[58] Field of Search ................................ 310/103, 104

[56] References Cited

U.S. PATENT DOCUMENTS

| | | | |
|---|---|---|---|
| 1,697,142 | 1/1929 | Roller | 310/104 X |
| 2,898,485 | 8/1959 | Richter et al. | 310/104 |
| 3,391,289 | 7/1968 | Danilewicz et al. | 310/103 X |
| 3,462,666 | 8/1969 | Martinek | 310/14 UX |
| 3,483,412 | 12/1969 | Bakker et al. | 310/103 |
| 3,847,502 | 11/1974 | Isbell | 310/104 X |

Primary Examiner—Donovan F. Duggan
Attorney, Agent, or Firm—Blanchard, Flynn, Thiel, Boutell & Tanis

[57] ABSTRACT

The invention is concerned with a magnetically coupled arrangement for a driving and a driven member, which arrangement is operable by a pressure medium and is used in a conveying system. A slidable piston (16) within a tube (10) has an arrangement of annular magnets (20) provided at each end with sealing and sliding members (24, 26). A driven assembly (18) slidable on the outer surface of the tube (10) has an arrangement of annular magnets (32) corresponding to the magnets (20) and provided at each end with a sliding ring (44). The members (24, 26, 44) prevent ingress of foreign bodies to the magnet locations, and consequently enable the spacing between the magnets and the tube (10) to be very small. A good magnetic coupling is achieved resulting in effective transmission of power. Several pistons (16) abutting one another can be used for conveying heavy loads.

7 Claims, 1 Drawing Figure

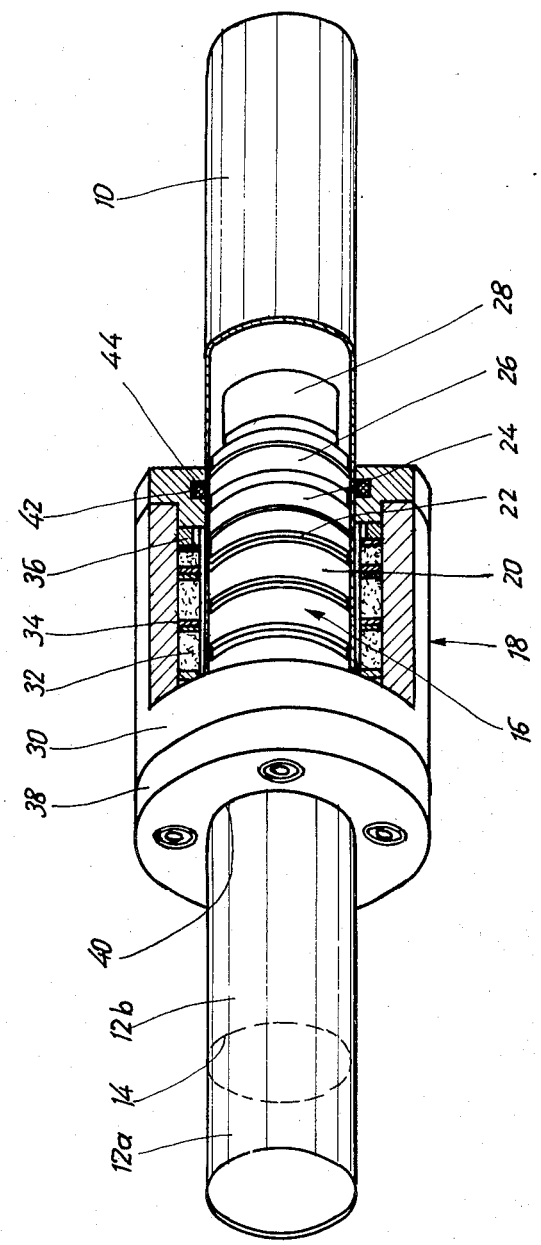

MAGNETICALLY COUPLED ARRANGEMENT FOR A DRIVING AND A DRIVEN MEMBER

FIELD OF THE INVENTION

Background of the Invention

The invention relates to a magnetically coupled arrangement operable by a pressure medium, and for use in a conveying system.

Magnetically coupled arrangements of this type are primarily used in conveying systems, having a driven assembly connected with a carriage for the goods to be conveyed. In this way, even goods of large size can be conveyed in a way similar to a pneumatic tube conveyor system.

In order to ensure trouble-free operation, the known magnetically coupled arrangement requires a greater degree of radial play between the adjacent surfaces of the magnet arrangements and the tube. It was generally agreed that this would be the only way of coping with the unavoidable surface roughness and cross-sectional irregularities of the tube. On the other hand, in the interests of increasing the magnetic drive force between the piston and the driven assembly, the total air gap between the two magnet arrangements would have to be kept as small as possible. A design incorporating a small air gap would require smaller, and thus lighter and substantially cheaper magnet arrangements than those used to date to achieve the required drive force between the piston and the driven assembly of the linear motor.

It was recognised that the non-magnetic materials available today have surface qualities good enough to enable by this alone a substantial reduction in the air gaps between magnet arrangements and tube surfaces in comparison with prior art, though unacceptable faults invariably developed in practical operation. These faults, however, have now been found to be due not to surface roughness and cross-sectional irregularities (superior surface quality can now be achieved even in butt-welded tube sections), but rather to the presence of dirt and impurities on the tube surfaces, which cannot pass through the small gaps between magnet arrangements and tube surfaces but tend to be wedged in said gaps.

According to the present invention there is provided a magnetically coupled arrangement for use in a conveying system, said motor being operable by a pressure medium and comprising a tubular part connectible to a source of the pressure medium, a piston which is slidable in said tubular part and which has sealing means at each end for wiping engagement with an internal surface of the tubular part and so as to form a seal for the pressure medium, and a driven assembly which is slidable on the tubular part and which has means at each end for wiping engagement with an external surface of the tubular part, the piston and the driven assembly each carrying a drive magnet arrangement in the form of a hollow cylindrical assembly, each magnet arrangement having radial play relative to the adjacent surface of the tubular part, and surfaces of the magnet arrangements which face the tubular part being closely adjacent to the respective surfaces of the tubular part.

Preferably the wiping means of the driven assembly and the sealing means of the piston lie in the same plane transversal to the axis of the tubular part. The contact pressure of the wiping means and sealing means does not exert a torsional deforming moment on the tubular part, which should preferably have thin walls in order to ensure a small total air gap between the two magnet arrangements.

Preferably also, the sealing means of the piston comprise sealing rings and the piston is provided with sliding guide rings near the sealing rings. The advantage of this is that a relatively soft material can be used for the piston sealing rings, which no longer have to perform any significant guiding functions. In this way, friction losses in the motor can be reduced to a minimum.

The tubular part may be made of a thin, stainless material such as non-magnetic special steel, brass or a plastics material, and water or a mixture of water and oil may be used as the pressure medium. The movement of the piston and of the driven assembly is initiated immediately the pressure medium is admitted and stopped as soon as the admission of pressure medium ceases, which permits extremely accurate positioning of the driven assembly by controlling the pressure medium supply. The pressure of the medium does not have to be high, since the piston is moved more by being carried along in the medium flow than by the admission of differential pressure.

If the driven assembly is provided with a sleeve made of a magnetisable material, which encircles the hollow cylindrical assembly of the magnet arrangement, magnetic leakage fields in the vicinity of the driven assembly can be kept to a minimum. In this way, undesirable braking forces, which would otherwise be generated while piston and driven assembly pass magnetisable machine components, are avoided. By selecting a non-magnetisable material for the piston body, a more inhomogeneous magnetic field is generated in the space defined by the driven assembly, a favourable development in the interests of increasing the drive force.

Advantageously the magnet arrangements are represented by radially polarised annular magnets arranged in axial sequence and separated from each other by non-magnetisable spacer rings. The segmented structure of the magnet arrangements contributes to the creation of an axially inhomogeneous magnetic field, which again increases the drive force exerted on the driven assembly by the piston.

If the piston carries a flexible buffer at each end, the peripheral surface of which is spaced radially from the internal surface of the tubular part, the piston can be stopped very accurately by running into a rigid obstacle. A further advantage of this development lies in the fact that a piston of large overall axial dimensions can be constructed, which can pass through curved tube sections inspite of the small radial distance between the internal magnet arrangement and the internal tube surface. In this way a long magnetically coupled arrangement comprising articulated piston sections and corresponding magnetically coupled driven assemblies tiltable relative to each other is achieved. With a magnetically coupled arrangement of this design, a large load is distributed over a long tube section, the drive force between piston and driven assembly is satisfactory, and the piston can pass through curved tube sections.

BRIEF DESCRIPTION OF THE DRAWINGS

An embodiment of the invention will now be described by way of example only with reference to the accompanying drawing, the single FIGURE of which is a perspective view of a magnetically coupled arrangement according to the invention, a section of the driven assembly and of the tube having been removed to show details of the piston.

DETAILED DESCRIPTION

The drawing illustrates a magnetically coupled arrangement operated by a pressure medium, a relatively thin-walled and narrow tube 10 being made of a stainless, non-magnetic material such as non-magnetic special steel, brass or a plastics material, if preferred with glass reinforcement. The tube is made up of butt-welded or joined tube segments 12a, 12b joined by welds 14 which do not result in any surface irregularities in the internal or the external tube surface. Within the tube 10, which may be connected to a pressure medium source or sink at either or both ends, a piston 16 is movably arranged. A driven assembly 18 is movably mounted on the outside of the tube 10. A carriage for the goods to be conveyed, which is not illustrated here, can be attached to the driven assembly 18.

The piston 16 comprises a piston body made of aluminium or another light-weight non-magnetic material. This piston carries permanent annular magnets 20 which are arranged in axial sequence, and which are radially polarised and separated by spacers 22. At each end of the annular magnet arrangement which forms a hollow cylindrical assembly, the piston body is provided with sliding guide rings 24 partially seated in grooves on said piston body and projecting beyond the piston body surface, which sliding guide rings pass along the internal tube surface in a sliding fit. Outside, if viewed axially, of these sliding guide rings 24 are arranged elastomeric sealing rings 26, also seated in grooves on the piston body. Each end face of the piston carries a buffer 28, by which the piston 16 can be brought to a halt against a fixed stop, not illustrated here. These buffers 28 further serve in mechanically linking several pistons 16, as will be described in more detail below.

The external surface areas of the annular magnets 20 are very close to the internal surface of the tube 10. Since, however, the annular magnet arrangement 20 is enclosed on each side by a sliding guide ring 24 and a sealing ring 26, any impurities left in the tube 10 from its manufacturing process or carried along with the pressure medium, (preferably oil or a mixture of 95% water and 5% oil), cannot penetrate into the small gap between the outside of the annular magnet arrangement of the piston and the inside of the tube. Such impurities might otherwise result in the piston 16 seizing in the tube 10.

Instead, any such impurities are pushed along in front of the piston 16 by the sealing rings 26 or—should they manage to get past these—by the sliding guide rings 24, so that the annular magnet arrangement is invariably faced by a clean section of the internal tube wall.

The design of the driven assembly 18 of the magnetically coupled arrangement is essentially the inverse of the piston 16, the mirror image being a cylindrical surface midway between the external and the internal tube surfaces. The counterpart of the piston body is a sleeve 30 made of a magnetisable material to reduce magentic leakage fields. The sleeve 30 encloses permanent annular magnets 32 arranged in axial sequence, which magnets are radially polarised in the same direction as the annular magnets 20 and separated by spacers 34. The annular magnets 32 are clamped between two end faces 38 likewise made of a magnetisable material and bolted to the sleeve 30 by way of elastomeric thrust rings 36.

The end faces 38 have a central opening 40 encircling the tube 10 with little play, and in the peripheral inner surface of each end face 38, which is coated with a low friction material such as tetrafluoroethylene, is provided an inwardly opening groove 42 in which a wiper ring 44 is located. These wiper rings 44 ensure, in the case of the driven assembly 18, that the internal surface area of the hollow cylindrical magnet arrangement 32 is very close to the external surface of the tube 10, and that no foreign bodies can penetrate into the narrow gap between the annular magnets 32 and the tube surface. Any such foreign bodies, which commonly collect on tube surfaces not protected from the surrounding atmosphere, are pushed away by the wiper rings 44 before reaching the annular magnets 32.

Since the overall "air" gap between the internal magnet arrangement represented by the annular magnets 20 and the external magnet arrangement represented by the annular magnets 32 (this being made up of the distance between the annular magnets 20 and the internal tube surface, the wall thickness of the tube 10 and the distance between the annular magnets 32 and the external tube surface) can now be kept very small (there is no need for small foreign bodies to pass through between the magnet arrangements and the tube surfaces), a very good magnetic coupling can be achieved between the two annular magnet arrangements, resulting in effective transmission of the power provided by the pressure medium to the driven assembly.

As the illustration shows, there is a flush radial arrangement of the wiper rings 44 and the sealing rings 26, so that the contact force does not exert any torsional moment on the tube. This enables easy movement of the piston and the driven assembly along curved tube sections.

The magnetically coupled arrnagement described above is easily adapted for transporting heavier loads. Two pistons 16 are axially arranged in a tube section with auxiliary venting, the pistons butting against each other by their buffers 28, and driven assembly is provided for each piston to be automatically aligned with the corresponding piston by magnetic force. The carriage for the goods in then pivotally mounted on each of the driven assemblies. In this way, the two pistons now effectively form a piston of double (triple etc.) length with "articulated" individual pistons (held in contact by pressure), ensuring synchronous movement of the two (three etc.) driven assemblies. In this way, the weight of the load to be conveyed is distributed over a long tube section without, however, creating any passage problems such as would occur when using correspondingly long pistons and driven assemblies in conjunction with the small air gaps between magnet arrangements and tube surfaces which are specified in the invention. Even passage along curved tube sections is possible, which would not be the case with one-piece pistons and driven assemblies of corresponding length.

It is obvious that this effective lengthening of the driving and the load carrying assemblies can be achieved, without in any way modifying the standard components of the magnetically coupled arrangement, i.e. piston 16, driven assembly 18, for example on site and after completion of the initial installation. The distribution of the load over a longer section of the tube 10 is of special importance in the case of thin tubes, which in turn are preferable from the point of view of the magnetic coupling between piston and driven assembly. Thin plastic tubes, otherwise being an excellent solution owing to their surface properties, tend to have inferior load carrying capacity, which is why articulated piston and driven assembly arrangements are especially suitable for tubes of this kind.

To stop the driven assembly at a certain point, a position transmitter acting on the pressure medium supply for the tube 10 is installed. This transmitter may either respond mechanically or optically to the approach of the driven assembly, or can alternatively be an inductive transmitter or a transmitter responding to magnetic leakage fields, e. g. a reed switch.

Various modifications may be made without departing from the invention.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an arrangement having a hollow cylindrical tube and driving and driven members movable thereon for conveying articles, the improvement comprising wherein said tube is made of a nonmagnetic material, wherein said driving member is a piston movably mounted on the inside of said tube, said piston having a piston body and plural axially spaced, first permanent annular magnets encircling said piston body, said piston further including first means spacing said first permanent magnets in said axial spaced relation, the radially peripheral surface of said magnets being oriented close to the internal wall surface of said tube, said piston further including plural guide ring means encircling said piston body and slidingly engaging said internal wall and first sealing rings located axially outside said guide rings for wiping said internal wall as said piston moves along said tube to thereby cause any impurities that may be present in said tube to be pushed along said tube so that said first annular magnets will be free of interference from said impurities, wherein said driven member includes a cylindrical sleeve made of a magnetizable material and encircles said tube, said sleeve having plural axially spaced second permanent annular magnets affixed thereto and in magnetically attracting relation to said first permanent annular magnets and second means spacing said second permanent annular magnets in said axially spaced relation, the radially inner surface of said magnets being oriented close to the external surface of said tube, said sleeve having end face means with second sealing rings located axially outside said second permanent annular magnets for wiping the external wall surface of said tube as said driven member is moved along said tube in response to a driving movement of said piston to thereby cause any impurities that may be present on said tube to be pushed along said tube so that said second permanent annular magnets will be free of interference from said impurities.

2. The arrangement according to claim 1, wherein said sealing rings on said driven member are formed as wiper rings which are seated in annular grooves opening inwardly on said end face means of said driven assembly.

3. The arrangement according to claim 1, wherein said sealing rings on said driven assembly and said sealing rings on said piston lie in the same plane perpendicular to the axis of said tube.

4. The arrangement according to claim 1 wherein said tube is made of a thin non-magnetic material, and wherein water or a mixture of water and oil is used as the pressure medium.

5. The arrangement according to claim 1, wherein said sealing rings are formed of a pliable, elastic material.

6. The arrangement according to claim 1, wherein said piston body is made of a non-magnetisable material.

7. The arrangement according to claim 1, wherein said piston has a flexible buffer at each end, the peripheral surface of which is spaced radially from the internal surface of said tube.

* * * * *